United States Patent
Kephart et al.

(10) Patent No.: US 11,046,836 B2
(45) Date of Patent: Jun. 29, 2021

(54) FORMULATIONS AND PRODUCTS TO REPLACE SINGLE-USE PLASTICS AND POLYSTYRENE WITH BIO-BENIGN MATERIALS SUCH AS AGRICULTURAL WASTES

(71) Applicant: NutJobs, Carmel, CA (US)

(72) Inventors: Paul Ray Kephart, Carmel, CA (US); John C. Warner, Wilmington, MA (US); William E. Dorogy, Newburyport, MA (US); Samuel Ellman, Somerville, MA (US)

(73) Assignee: NUTJOBS, Carmel, CA (US)

( * ) Notice: Subject to any disclaimer, the term of this patent is extended or adjusted under 35 U.S.C. 154(b) by 0 days.

(21) Appl. No.: 17/074,034

(22) Filed: Oct. 19, 2020

(65) Prior Publication Data

US 2021/0115228 A1    Apr. 22, 2021

Related U.S. Application Data

(60) Provisional application No. 62/923,044, filed on Oct. 18, 2019.

(51) Int. Cl.
| | |
|---|---|
| *C08K 11/00* | (2006.01) |
| *C08G 63/08* | (2006.01) |
| *C08L 67/04* | (2006.01) |
| *C08L 97/00* | (2006.01) |
| *B29K 67/00* | (2006.01) |

(52) U.S. Cl.
CPC ............ *C08K 11/005* (2013.01); *C08G 63/08* (2013.01); *C08L 67/04* (2013.01); *C08L 97/00* (2013.01); *B29K 2067/046* (2013.01); *B29K 2995/006* (2013.01); *C08J 2367/04* (2013.01); *C08L 2201/06* (2013.01)

(58) Field of Classification Search
CPC ....... C08K 11/005; C08G 63/08; C08L 67/04; C08L 2201/06; C08L 97/00; C08J 2367/04; B29K 2067/046; B29K 2995/006
USPC ......................................................... 523/128
See application file for complete search history.

(56) References Cited

U.S. PATENT DOCUMENTS

| | | | |
|---|---|---|---|
| 3,983,842 A | | 10/1976 | Marion et al. |
| 2002/0064495 A1 | * | 5/2002 | Miura .................... C10B 53/02 |
| | | | 423/445 R |
| 2015/0018183 A1 | | 1/2015 | Hasumi |
| 2019/0021837 A1 | | 1/2019 | MacEwan et al. |

FOREIGN PATENT DOCUMENTS

| | | | |
|---|---|---|---|
| CN | 108641256 | * | 10/2018 |
| EP | 0 533 314 A2 | * | 3/1993 |
| WO | 120417 A2 | | 8/2014 |
| WO | WO 2019/113520 | * | 6/2019 |

OTHER PUBLICATIONS

Derwent of CN 108641256 (Year: 2018).*
International Search Report of International Application No. PCT/US20/56334, dated Dec. 7, 2020.

* cited by examiner

*Primary Examiner* — Doris L Lee
(74) *Attorney, Agent, or Firm* — Polsinelli PC

(57) ABSTRACT

The present invention provides cured nut waste composite, methods for preparing the nut waste composite, and methods for utilizing the nut waste composite.

24 Claims, 4 Drawing Sheets

FORMULATIONS AND PRODUCTS TO REPLACE SINGLE-USE PLASTICS AND POLYSTYRENE WITH BIO-BENIGN MATERIALS SUCH AS AGRICULTURAL WASTES

CROSS REFERENCE TO RELATED APPLICATIONS

The present application claims benefit under 35 U.S.C. § 119 of U.S. Provisional Patent Application No. 62/923,044, entitled, "FORMULATIONS AND PRODUCTS TO REPLACE SINGLE-USE PLASTICS AND POLYSTYRENE WITH BIO-BENIGN MATERIALS SUCH AS AGRICULTURAL WASTES," filed Oct. 18, 2019, the entirety of which is incorporated herein by reference.

FIELD OF THE INVENTION

The present disclosure generally relates to composites comprising a nut waste component and one or more binders.

BACKGROUND OF THE INVENTION

Plastic products have been shown to not only pollute the environment through their production but also do not appreciably degrade. Products such as Styrofoam, plastic grocery bags, plastic bottles, and plastic six pack ring carriers for soda and beer cans have been documented which adversely affects wildlife, wildlife habitat, and human life. Plastic pollution can afflict land, waterways and oceans. It is estimated that 1.1 to 8.8 million tons of plastic waste enters the ocean from coastal communities each year. Living organisms, particularly marine animals, can be harmed either by mechanical effects, such as entanglement in plastic objects, problems related to ingestion of plastic waste, or through exposure to chemicals within plastics that interfere with their physiology. Effects on humans include disruption of various hormonal mechanisms. As of 2018, about 380 million tons of plastics are produced worldwide each year. From the 1950s up to 2018, an estimated 6.3 billion tons of plastic have been produced worldwide, of which an estimated 9% has been recycled and another 12% has been incinerated. Even though plastics can be recycled, their rate of biodegradability is considered low.

Nut wastes, shells, hulls, and nut enclosures, from nuts are generally incinerated or discarded. This waste not only places a burden on the environment but also wastes a large amount of useable resources. This waste is considered a biomass and can be used in products which environmentally friendly and reduce the pollution in the environment.

As an example, California produces an estimated 80% of the world's almond nuts. During the 2013-2014 crop year, nut growers produced approximately 7 billion pounds of almond nut almond fruit (drupe) resulting in 2 billion pounds of almond nuts, 4 billion pounds of almond hulls, and 1 billion pounds of almond shells. Most of these almond nut shells and almond hulls were sold as cattle feed and used in fuel for boilers and power generation. However, a sizable fraction of these almond shells and almond hulls were sent to landfills. Thus, an important resource in the almond nut almond shells and hulls were wasted.

Other culinary nuts and non-culinary nuts face the same fate as the almonds. The drupes or fruit are removed, leaving the hull, shell, nut enclosure, or a combination of these as a waste.

Customers of these plastic products have requested new, ecofriendly products. These products would not leave a lasting foot-print on the environment. Some of these products, such as cups, are now made solely of paper.

What is needed is an environmentally friendly product which can be used to replace plastic products and have increased biodegradability.

FIGURES

SUMMARY OF THE INVENTION

Figure 1:
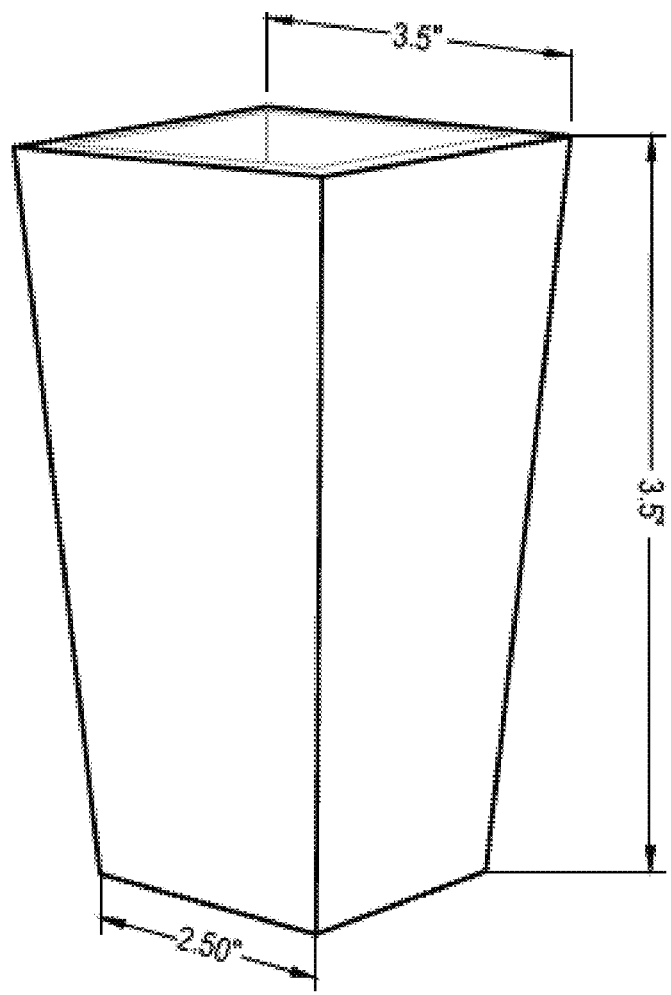
FIG. 1 and FIG. 2 are graphical representations of various pots produced using the nut waste composite.

One aspect, as disclosed herein, is a cured nut waste composite, the composite comprises: (a) 65 to 99.9 wt % of a nut waste component including nut shells, nut hulls, or a combination of nut shells and nut hulls; and (b) 0.1 to 35 wt % of one or more binders including polyhydroxybutyrate (PHB), polyhydroxyalkanoate (PHA), polylactic acid (PLA), guayule, natural latex, bentonite, an anionic starch, hyaluronic acid, and any combinations thereof.

Another aspect, as disclosed herein, is a cured nut waste composite, the composite comprises: (a) 35 to 85 wt % of a nut waste component including nut shells, nut hulls, or a combination of nut shells and nut hulls; and (b) 15 to 65 wt % of one or more binders including polyhydroxybutyrate (PHB), polyhydroxyalkanoate (PHA), polylactic acid (PLA), guayule, natural latex, bentonite, an anionic starch, hyaluronic acid, and any combinations thereof.

In yet another aspect, as disclosed herein, is a cured nut waste composite, the composite comprises: (a) 5 to 15 wt % of a nut waste component including nut shells, nut hulls, or a combination of nut shells and nut hulls; and (b) 85 to 95 wt % of one or more binders including of polyhydroxybutyrate (PHB), polyhydroxyalkanoate (PHA), polylactic acid (PLA), guayule, natural latex, bentonite, an anionic starch, hyaluronic acid, and any combinations thereof.

Other features and iterations of the invention are described in more detail below.

DETAILED DESCRIPTION OF THE INVENTION

Provided herein are composites of cured nut waste, methods for preparing these cured nut waste composites, and methods for utilizing these nut waste composites. Advantageously, these cured nut waste composites are low cost, environmentally friendly, biodegradable, easily manufactured, and can be formed into various shapes and sizes.

(I) Cured Nut Waste Composites

The present disclosure encompasses cured nut waste composites comprising a nut waste component and one or more binders. The cured nut waste composite further comprises at least one fungus, at least one bacteria, or a combination of at least one fungus and at least one bacteria.

(a) Nut Waste Component in Composite

The nut waste component is a by-product of removing the nut hull and nut shell from the fruit of the nut, also known as the drupe. Generally, the nut hull and nut shell are disposed of and not utilized in any significant amount in a commercial product. Generally, the nut waste component includes a nut shell, a nut hull, or a combination of a nut shells and a nut hulls. In various embodiments, the nut waste component including nut shells, a nut hulls, or a combination of nut shells and nut hulls may be pre-processed before introduction into the nut waste composite.

A variety of nut shells and nut hulls may be used in the nut waste component. Generally, these nut shells and nut hulls can be derived from a number of nuts. Non-limiting examples of the these nuts may be an acorn, American beech, almond, breadfruit, candlenut, chestnuts, peanuts, hazelnuts, kola nuts, palm nuts, red bopple nuts, cashews, coconuts, hickory, pecans, Jack nuts, pistachio, walnuts, pine nuts, ginko nuts, Brazil nuts, macadamia, and paradise nut. In one embodiment, the nut is an almond.

As appreciated by the skilled artisan, the nut waste component comprises various mixtures of cellulose, hemicellulose, and lignin. The mixtures of cellulose, hemicellulose, and lignin provide hydroxyl and phenolic functionalities that will cross-link with themselves and/or one or more binders. This cross-linking produces a composite that provides increased strength as well as flexibility.

In various embodiments, the nut waste component including nut shells, a nut hulls, or a combination of nut shells and nut hulls may be a pre-processing step before introduction into the composite. This pre-processing step dries the nut waste component, adjusts the pH of the nut waste component and dries the nut waste component, adjusts the pH of the nut waste component and sterilizes the nut waste component, or adjusts the pH of the nut waste component and torrefies the nut waste component.

In general, the nut waste component has a residual moisture content of less than 0.5 wt % water, more preferably less than 0.1 wt % water. The temperature at which the nut waste component was dried may range from about 80° C. to about 120° C. for a duration of time. This drying process may utilize an inert atmosphere or reduced vacuum.

The nut waste component has a pH in a ranging from 5.5 to 8.0 before introduction into the composite. In various embodiments, the pH of the nut waste hulls, the nut waste shells, or a combination of the nut waste hulls and nut waste shells ranges from 5.5 to 8.0, or 6.5 to 7.0.

The nut waste component has a specific size before introduction into the composite. The size of the nut waste component may be less than 250 μm or less than 500 μm and greater than 250 μm. These sizes of the nut waste component provide composites that can be readily formed into various shapes allows for increased strength of the composites, and also allows the composites to be flexible.

In general, the weight percentage (wt %) of the nut waste component may range from about 5 wt % to about 99.9 wt %. In various embodiments, the wt % of the nut waste component may range from about 5 wt % to about 99.9 wt %, from about 15 wt % top about 65 wt %, or from 30 wt % to about 50 wt %. In preferred embodiments, the wt % of the nut waste component ranges from about 5 wt % to about 15 wt %, from about 15 wt % to about 65 wt %, or from about 65 wt % to about 99.9 wt %.

(b) Binders in the Nut Waste Composite

The nut waste composite comprises one or more binders. These binders cross-link with the hydroxyl and/or phenolic functionality of the cellulose, hemicellulose, and lignin. Non-limiting examples of suitable binders may be polyhydroxybutyrate (PHB), polyhydroxyalkanoate (PHA), polylactic acid (PLA), guayule, natural latex, bentonite, an anionic starch, hyaluronic acid, water, and any combinations thereof. In one embodiment, the binders including polyhydroxybutyrate (PHB), polyhydroxyalkanoate (PHA), polylactic acid (PLA), guayule, natural latex, bentonite, an anionic starch, hyaluronic acid, and any combinations thereof. In another embodiment, the binder is water. The water may be distilled water, deionized water, or potable (tap) water.

Generally, the weight % (wt %) of one or more binders in the nut waste composite may range from 0.1 wt % to about 95 wt %. In various embodiments, the wt % of the one or more binders may range from about 0.1 wt % to about 95 wt %, from about 15 wt % to about 65 wt %, or from 30 wt % to about 50 wt %. In preferred embodiments, the wt % of one or more binders ranges from 0.1 wt % to 35 wt %, 35 wt % to 85 wt %, or from 85 wt % to 95 wt %.

(c) Optionally Comprising at Least One Fungus, at Least One Bacteria, or at Least One Fungus and at Least One Bacteria The nut waste composite optionally comprises at least one fungus, at least one bacteria, or a combination of at least one fungus and at least one bacteria. The inclusion of at least one fungus, at least one bacteria, or a combination of at least one fungus and at least one bacteria enhances the biodegradability of the composite and the product that is prepared from the composite. Non-limiting examples of suitable fungus and bacteria may be *Mycorrihizal inoculum, aureofaciens, Deinococcus erythromyxa, Glomus intraradices, Glomus mosseae, Glomus aggregatum, Glomus clarum, Glomus deserticola, Glomus etunicatum, Gigaspora margarita, Rhizopogon villosullus, Rhizopogon luteolus, Rhizopogon amylopogon, Rhizopogon fulvigleba, Pisolithud tinctorius, Laccaria lacata, Laccari bicolor, Suillus granulatus, Suillus puntatapies, Trichoderma harzianum Trichoderma konigii, Bacillus subtillus, Bacillus lichenformis, Bacillus azotoformans, Bacillus megaterium, Bacillus coagulans, Bacillus pumlis, Bacillus thurengiensis, Bacillus stearothermiphilis, Paenibacillus polymyxa, Paenibacillus durum, Paenibacillus florescence, Paenibacillus gordonae, Azotobacter polymyxa, Azotobacter chroococcum, Sacchtomyces cervisiae, Streptomyces griseues, Streptomyces lydicus, Pseudomonas aureofaceans, Deinococcus erythromyxa, Aureofaceans*, and *Deinococcus erythromyxa*.

The inclusion of the at least one fungus, at least one bacteria, or a combination of at least one fungus and at least one bacteria may occur after the composite is prepared.

(d) Properties of the Nut Waste Composite

The cured nut waste composites exhibit some beneficial and unique properties. Some of these properties are increased strength, enhanced biodegradability, ease of production of the nut waste composite, and low cost. These properties are unique.

The cured nut waste composites exhibit an elastic modulus ranging from about 2000 N/mm$^2$ to about 2800 N/mm$^2$. These elastic modulus values indicate that the cured nut waste composites are rigid.

The cured nut waste composites exhibit a break stress (N/mm$^2$) from about 3.0 N/mm$^2$ to about 40 N/mm$^2$.

With the incorporation of the nut waste component, the cured nut waste composites are flexible. The nut waste composites are softer and more flexible as compared to plastic materials. During the preparation of the nut waste composites, the nut waste component increases the plasticity of the composites, decreases the viscosity and friction as measured by a reduced amount of torque necessity for compounding.

The cured nut waste composites produced may be formed or casted into a number of forms or shapes for use in further processing to form end products. Some non-limiting examples of suitable forms or shapes are not limited to viscous liquid resins, solid resins, pellets, flakes, disks, wafers, or ribbons.

(e) Exemplary Embodiments

In one embodiment, the almond nut waste component including dried almond nut shells, dried almond nut hulls, or a combination of dried almond nut shells and dried almond hulls. The nut waste component has a pH of 5.5 to 8.0, preferably from 6.5 to 7.0 before drying; the size of the nut waste component is less than 250 µm or less than 500 µm and greater than 250 µm. The one or more binders is a combination of PLA and PHB. The wt % of the almond nut waste component ranges from 65 wt % to 99.9 wt % and the wt % of one or more binders ranges from 0.1 wt % to about 35 wt %. The almond nut waste composite optionally comprises at least one fungus, at least one bacteria, or at least one fungus and at least one bacteria.

In another embodiment, the almond nut waste component including dried almond nut shells, dried almond nut hulls, or a combination of dried almond nut shells and dried almond hulls. The nut waste component has a pH of 5.5 to 8.0, preferably from 6.5 to 7.0 before drying; the size of the nut waste component is less than 250 µm or less than 500 µm and greater than 250 µm. The one or more binders is a combination of PLA and PHB. The wt % of the nut waste component ranges from 15 wt % to 65 wt % and the wt % of one or more binders ranges from 35 wt % to about 85 wt %. The nut waste composite optionally comprises at least one fungus, at least one bacteria, or at least one fungus and at least one bacteria.

In yet another embodiment, the almond nut waste component including dried almond nut shells, dried almond nut hulls, or a combination of dried almond nut shells and dried almond hulls. The nut waste component has a pH of 5.5 to 8.0, preferably from 6.5 to 7.0 before drying; the size of the nut waste component is less than 250 µm or less than 500 µm and greater than 250 µm. The one or more binders is a combination of PLA and PHB. The wt % of the waste almond nut component ranges from 5 wt % to 15 wt % and the wt % of one or more binders ranges from 85 wt % to about 95 wt %. The almond nut waste composite optionally comprises at least one fungus, at least one bacteria, or at least one fungus and at least one bacteria.

In still other embodiments, the almond nut waste component including torrefied almond nut shells, torrefied almond nut hulls, or a combination of torrefied almond nut shells and torrefied almond hulls. The nut waste component has a pH of 5.5 to 8.0, preferably from 6.5 to 7.0 before drying; the size of the nut waste component is less than 250 µm or less than 500 µm and greater than 250 µm. The one or more binders is a combination of PLA and PHB. The wt % of the nut waste component ranges from 5 wt % to 15 wt % and the wt % of one or more binders ranges from 85 wt % to about 95 wt %. The almond nut waste component optionally comprises at least one fungus, at least one bacteria, or at least one fungus and at least one bacteria.

(II) Methods for Preparing the Nut Waste Composite

The present disclosure also encompasses methods for preparing the cured nut waste composite. The methods comprising: (a) providing an nut waste component; (b) drying the nut waste component or adjusting the pH of the nut waste component then drying, sterilizing, or torrefying the nut waste component; (c) adjusting the size of the nut waste component; (d) contacting the nut waste component from step (c) with at least one or more binders; (e) heating the components from step (d); (f) forming the nut waste composite; and (g) optionally contacting cured nut composite with at least one fungus, at least one bacteria, or a combination of at least one fungus and one bacteria.

(a) Providing a Nut Waste Component

The method commences by providing a nut waste component. In one embodiment, the nut waste component is obtained from a nut processing facility. The nut waste component includes nut waste shells, nut waste hulls, or a combination of water nut hulls and nut shells.

(b) Drying the Nut Waste Component or Adjusting the pH of the Nut Waste Component then Drying, Sterilizing, or Torrefying the Nut Waste Component The next step in the method consists of drying the nut waste component or adjusting the pH of the nut waste component then drying, sterilizing, or torrefying the nut waste component.

The nut waste component is dried to reduce the amount of residual water to less than 0.5 wt %, preferably less than 0.1 wt %. The temperature for drying the nut waste component may range from about 80° C. to about 120° C. In various embodiments, the temperature of drying may range from about 80° C. to 120° C., from 90° C. to about 110° C., or about 100° C. An inert atmosphere or reduced vacuum may be also utilized.

The duration of drying depends on the residual water content, the type of nut waste component, the amount of nut waste component that needs to be dried, and the target residual water in the nut waste component. In most cases, the nut waste component has a residual water content of less than 0.5 wt %, more preferably less than 0.1 wt %. Generally, the duration of drying may range from about 1 hour to about 48 hours. In various embodiments, the duration of drying may range from about 1 hour to about 48 hours, from about 4 hours to 24 hours, or from about 12 hours to about 16 hours.

For adjusting the pH, the nut waste component including nut waste hulls, nut waste shells, or a combination of nut waste hulls and nut shells is contacted with an aqueous solution of a proton acceptor. A pH of a mixture of the nut waste component and water is adjusted to a range of 5.5 to 8.0, more preferably 6.5 to 7.0.

The nut waste component is initially contacted with water forming a slurry. Once the slurry is prepared, a proton acceptor is contacted with the nut waste slurry thereby adjusting the pH of the nut waste component.

The amount of water used in the preparation of the slurry depends the nut waste component used, the amount of the nut waste component, the ability to adequately stir the slurry, and the specific proton acceptor used to adjust the pH. The water may be deionized, distilled, or potable water. In general, the amount of water to the nut waste component used in the slurry to adjust the pH may range from about 1:1 to about 100:1. In various embodiments, the amount of water to the amount of nut waste component used in the slurry may range from about 1:1 to about 100:1, from about 5:1 to about 80:1, from about 10:1 to about 60:1, or from about 20:1 to about 50:1. Once the slurry is prepared, the proton acceptor is added to adjust the pH.

Numerous proton acceptors may be used in adjusting the pH of the slurry of the nut waste component and water. Generally, the proton acceptor may be inorganic in nature. Non-limiting examples of suitable inorganic proton acceptors include sodium hydroxide, potassium hydroxide, calcium hydroxide, barium hydroxide, cesium carbonate, sodium bicarbonate, potassium bicarbonate, sodium carbonate, potassium carbonate, sodium borate, sodium dihydrogen phosphate, disodium hydrogen phosphate, sodium methoxide, sodium tert-butoxide, potassium tert-butoxide, sodium acetate, and potassium acetate.

The proton acceptor may be added as a solid, a concentrated aqueous solution of the proton acceptor, or a diluted solution of the proton acceptor to the slurry. The amount of the proton acceptor used depends on the initial pH of the nut waste component.

The pH of the slurry of the nut waste component and water is adjusted to a range of 5.5 to 8.0. In various embodiments, the pH of the nut waste hulls, the nut waste shells, or a combination of the nut waste hulls and nut waste shells is adjusted to a range of 5.5 to 8.0, or 6.5 to 7.0 utilizing the proton acceptor. The pH of the slurry is measured through means as disclosed in the arts, such as a pH meter, litmus paper, or an inline pH device.

After completion of the pH adjustment, the pH adjusted nut waste and water is filtered through means known in the art to remove excess water such as for example gravity filtration or centrifugation and may be washed with additional water. The water may be distilled water, deionized water, or potable water.

The pH adjusted material may be dried, sterilized, or torrefied. This step removes water, removes excess water and eliminates unwanted fungus and bacteria; or removes excess water, eliminates unwanted fungus and bacteria, and removing volatile organic compounds from the nut waste component.

For drying, the pH adjusted nut waste component is contacted with heat. The drying may further comprise utilizing an inert atmosphere such as helium or nitrogen or vacuum.

The temperature for drying the nut waste component may range from about 80° C. to about 120° C. In various embodiments, the temperature of drying may range from about 80° C. to 120° C., from 90° C. to about 110° C., or about 100° C. An inert atmosphere or reduced vacuum may be also utilized.

The duration of drying depends on the residual water content, the amount of nut waste component that needs to be dried, and the target residual water in the nut waste component. The target water content in the dried nut waste component is less than 0.5 wt %, more preferably 0.1 wt %. Generally, the duration of drying may range from about 1 hour to about 48 hours. In various embodiments, the duration of drying may range from about 1 hour to about 48 hours, from about 4 hours to 24 hours, or from about 12 hours to about 16 hours.

Sterilization removes excess water but also removes, kills, or deactivates all forms of life (in particular referring to microorganisms such as fungi, bacteria, viruses, spores, unicellular eukaryotic organisms such as *Plasmodium*, etc.) and other biological agents like prions present in the nut waste hull and nut shell. Sterilization may utilize an autoclave, dry heat sterilization, and further utilize a chemical agent such as ethylene oxide, nitrogen dioxide, ozone, and hydrogen peroxide.

The temperature for drying the nut waste component may range from about 100° C. to about 150° C. In various embodiments, the temperature of drying may range from about 100° C. to 150° C., from 110° C. to about 140° C., or about 125° C.

The duration of drying depends on the residual water content, the amount of nut waste component that needs to be dried, and the target residual water in the nut waste component. Generally, the duration of drying may range from about 1 hour to about 48 hours. In various embodiments, the duration of drying may range from about 1 hour to about 48 hours, from about 4 hours to 24 hours, or from about 12 hours to about 16 hours.

Torrefaction is a mild form of pyrolysis at temperatures typically between 200° C. and 320° C. that removes excess water, removes, kills, or deactivates all forms of life, and removes volatile organic compounds. Torrefaction changes the properties to reduce the amount of tars, organic materials, water, and methane within the nut waste component. Torrefaction produces a relatively dry product and generally hydrophobic material, which reduces or eliminates its potential for organic decomposition.

The temperature for drying the nut waste component may range from about 200° C. to about 320° C. In various embodiments, the temperature of drying may range from about 200° C. to 320° C., from 220° C. to about 300° C., or about 250° C.

The duration of drying depends on the residual water content, the amount of nut waste component that needs to be dried, and the target residual water in the nut waste component. Generally, the duration of drying may range from about 1 hour to about 48 hours. In various embodiments, the duration of drying may range from about 1 hour to about 48 hours, from about 4 hours to 24 hours, or from about 12 hours to about 16 hours.

(c) Adjusting the Size of the pH Adjusted Nut Waste Component

The next step in the method, step (c), comprises adjusting the size of the pH adjusted nut waste component from step (b). This method step consists of grinding, milling, or crushing the dried nut waster component from step (b) to achieve a specific size of the nut waste component. A solid sieve is additionally used to ensure the nut waste component is in the appropriate size range. The size of the nut waste component after grinding, milling, or crushing may be less than 250 µm or less than 500 µm and greater than 250 µm. Each of these sizes of the nut waste component are useful in producing a nut waste composite.

(d) Contacting the Nut Waste Component from Step (c) with at Least One or More Binders The next step, step (d), in the method consists of contacting nut waste component from step (c) with at least one or more binders. This method step comprises adding the nut waste component into the at least one or more binders, adding the nut waste component into the at least one or more binders in portions, adding the at least one or more binders into the nut waste component, or adding the at least one or more binders into the nut waste component in portions. During this contacting step, the mixture of the nut waste component and at least one or more binders is stirred or mixed using methods known in the art, such as a mechanical mixing, a mechanical stirring, or magnetic stirring, to ensure the mixture is adequately dispersed. This contacting step may also use compounding and extrusion. This continuous process mixes the components, and extrudes the composite in various shapes such as pellets, granules, and flakes for example.

(e) Heating the Mixture from Step (d)

The next step in the method comprises heating the components from step (d). This step in the method prepares a malleable pre-composite where the hydroxyl functionality of the cellulose, hemicellulose, and ligin react with the binder forming an extended polymer network. By maintaining the polymer at an elevated temperature, the polymer may be extruded, used in injection molding, air injected, or other means known in the art to form numerous shapes or numerous forms. As described above, step (d) and step (e) may occur in a single continuous process.

The temperature of heating the components from step (e) may range from about 150° C. to about 320° C. In various embodiments, the temperature of drying may range from about 150° C. to 320° C., from 180° C. to about 285° C., or about 200° C. to about 240° C.

In general, the duration of heating the mixture from step (e) may range from about 20 minutes to about 6 hours. In various embodiments, the duration of heating the mixture from step (e) may range from about 20 minutes to about 6 hours, from about 1 hour to 5 hours, or from about 2 hours to about 4 hours.

With the incorporation of the nut waste component into the composite, the nut waste composite acts a plasticizer. The nut waste composite is softer and more flexible as compared to plastic materials. During the preparation of the nut waste composite, the nut waste component increases the plasticity of the composite, decreases the viscosity and friction as measured by a reduced amount of torque necessity for compounding. This property allows for the preparation of a variety of forms, shapes, and articles in a number of shapes and sizes.

(f) Forming the Nut Waste Composite

The final step in the method is to allow the malleable composite from step (g) to cool to room temperature. In this step, the malleable composite cools to form composites in various forms or shapes. Some non-limiting examples of suitable forms or shapes are not limited to viscous liquid resins, solid resins, pellets, flakes, disks, wafers, or ribbons. The composites may be additionally heated again to an elevated temperature forming a malleable composite that may be also extruded, air injected, and molded into numerous shapes, or forms.

(g) Optionally Contacting the Composite with at Least One Fungus, at Least One Bacteria, or a Combination of at Least One Fungus and One Bacteria The last step in the method is optionally contacting cured nut waste composite with at least one fungus, at least one bacteria, or a combination of at least one fungus and one bacteria. The cured nut waste composite naturally biodegrades especially in contact with water. To enhance the rate of biodegradability of the cured nut waste composite, the composite may be contacted with at least one fungus, at least one bacteria, or a combination of at least one fungus and one bacteria. A list of suitable fungi and bacteria are detailed above in Section (I). The at least one fungus, at least one bacteria, or a combination of at least one fungus and one bacteria may be introduced using numerous methods known in the art. Non-limiting methods may be spraying an aqueous solution of at least one fungus, at least one bacteria, or a combination of at least one fungus and one bacteria or painting an aqueous solution of at least one fungus, at least one bacteria, or a combination of at least one fungus and one bacteria onto the composite.

(III) Methods of Using the Nut Waste Composite

The present disclosure also encompasses methods of using the cured nut waste composite. The cured nut waste composite can be casted, blow molded (using air or an inert gas such as extrusion blow molding, injection blow molding, and injection stretch blow molding), extrusion molded, injection molded, matrix molded, and thermoformed into various products as plastics. Some non-limiting examples of suitable forms or shapes are not limited to viscous resins, solid resins, pellets, flakes, disks, wafers, or ribbons.

These forms or shapes of the nut waste composites may be further made malleable using heat and transformed into a number of end products. Some non-limiting examples of suitable end products produced from the cured nut composite may be carpet underlayment, flooring, insulation, shipping containers for everything from wine, biotechnology, genetic engineering, organ procurement, diagnostic testing to pharmaceutical distribution, modular roofing and landscaping trays currently used in the building and landscape construction industry, biodegradable flower pots, seed pots, lids for cups, as well as many others.

Figure 2:
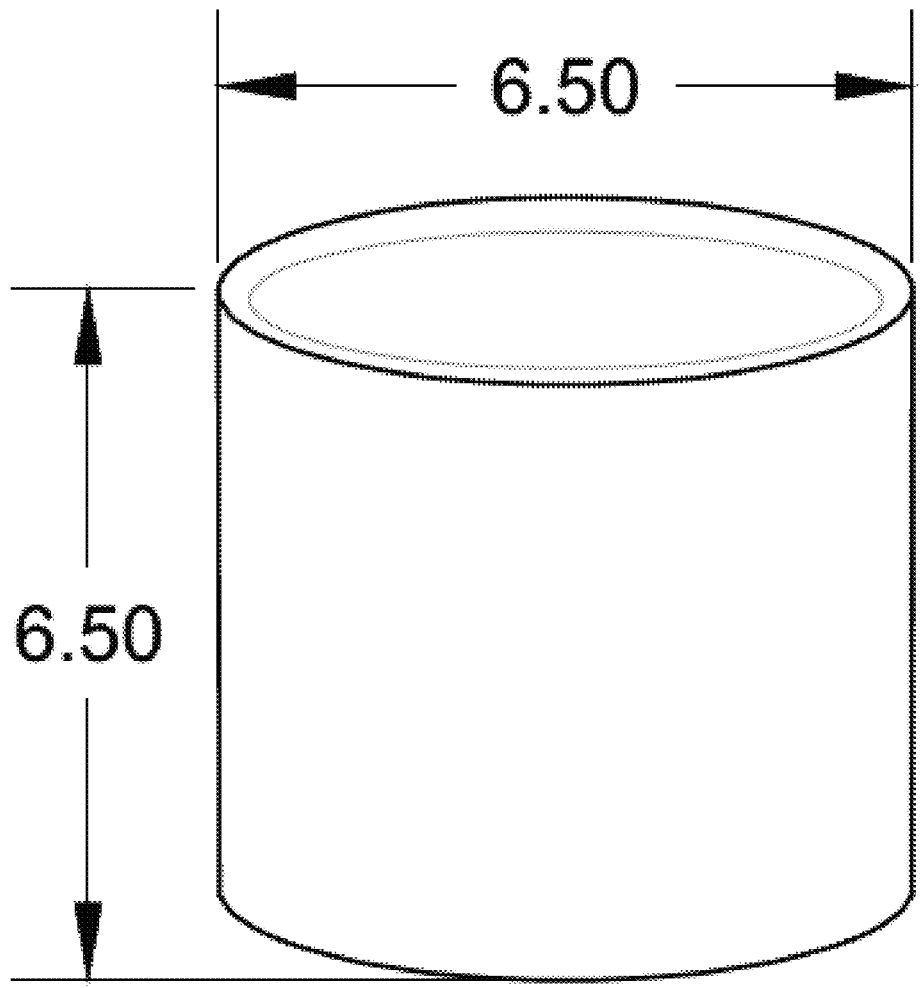
Figure 3:
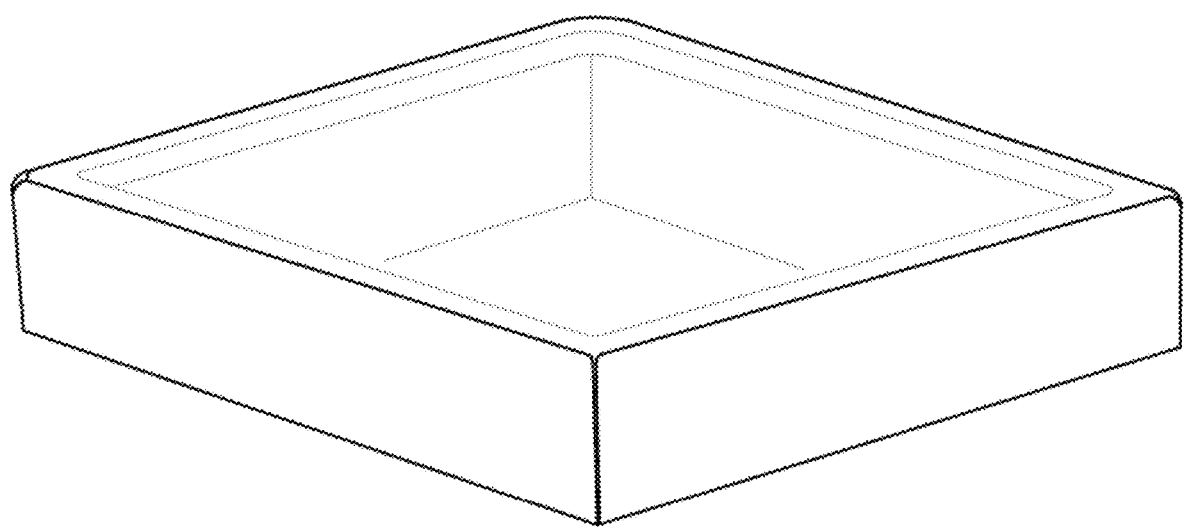
FIG. 3 is a graphical representation of a tray produced from the nut waste composite.
Figure 4:
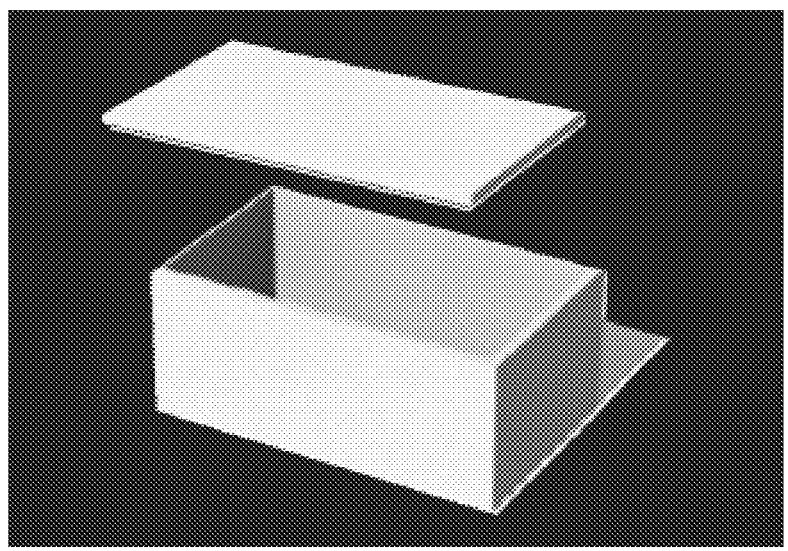
FIG. 4 shows shipping container produced using the nut waste composite.

FIG. 1 and FIG. 2 shows various pot produced using the nut waste composite. FIG. 3 shows a tray produced from the nut waste composite. FIG. 4 shows shipping container produced using the nut waste composite.

Definitions

When introducing elements of the embodiments described herein, the articles "a", "an", "the" and "said" are intended to mean that there are one or more of the elements. The terms "comprising", "including" and "having" are intended to be inclusive and mean that there may be additional elements other than the listed elements.

As various changes could be made in the above-described methods without departing from the scope of the invention, it is intended that all matter contained in the above description and in the examples given below, shall be interpreted as illustrative and not in a limiting sense.

EXAMPLES

Example 1

Into a compounder was placed 40 g of nut waste component in various sizes and amounts which were dried. Into the compounder was added the appropriate amount of an equal mixture of polylactic acid and polyhydroxybutyrate. The mixture was stirred mechanically for 30 minutes at room temperature then heated to 165° C.-200° C. for 10 minutes. These mixtures were cast into various disks to evaluate their mechanical properties. These mixtures were compared to a mixture of PLA and PHB (Bioplast 2202) without the nut waste component. Table 1, shown below, shows the results of these tests.

TABLE 1

| Composition | Elastic Modulus (N/mm2) | Max Stress (N/mm2) | Break Stress (N/mm2) | Max Displacement Strain % | Toughness J |
|---|---|---|---|---|---|
| 100% Bioplast 2202 | 2485 | 42.67 | 30.83 | 13.5 | 1.5905 |
| 5 Wt. % <250 um Shell | 2109 | 41.97 | 40.43 | 3.32 | 0.3204 |
| 10 Wt. % <250 um Shell | 2278 | 30.57 | 30.09 | 1.84 | 0.1195 |
| 15 Wt. % <250 um Shell | 2202 | 17.08 | 17.08 | 1.32 | 0.0748 |
| 20 Wt. % <250 um Shell | 2822 | 22.88 | 22.3 | 4.09 | 0.2361 |

TABLE 1-continued

| Composition | Elastic Modulus (N/mm2) | Max Stress (N/mm2) | Break Stress (N/mm2) | Max Displacement Strain % | Toughness J |
|---|---|---|---|---|---|
| 4.9 Wt. % <500 um & >250 um Shell | 2575 | 42.8 | 40.27 | 6.97 | 0.6958 |
| 9.9 Wt. % <500 um & >250 um Shell | 2696 | 38.3 | 37.88 | 4.32 | 0.4003 |
| 14.3 Wt. % <500 um & >250 um Shell | 2521 | 30.87 | 30.15 | 2.82 | 0.1871 |
| 20 Wt. % <500 um & >250 um Shell | 2562 | 26.46 | 26.46 | 2.12 | 0.1237 |
| 5 Wt. % <250 um Hull | 2565 | 24.99 | 24.96 | 1.61 | 0.0969 |
| 10 Wt. % <250 um Hull | 2021 | 3.44 | 3.29 | 0.27 | 0.0062 |
| 15 Wt. % <250 um Hull | 2016 | 12.08 | 10.44 | 3.06 | 0.093 |
| 20 Wt. % <250 um Hull | 2101 | 7.49 | NA | 6.76 | 0.0948 |

As can be seen in the above Table, the nut waste composites exhibit similar elastic modulus as compared to Bioplast 2202, provide similar break stress, and show lower max displacement strain, toughness, and max stress.

Example 2

Into a round bottom flask was placed 40 g of <250 μm dried nut shells. Into the flask was added 40 g of potable water. This mixture was stirred for 10 minutes until a homogeneous mixture was obtained. The mixture was placed in a Carver press at 150° C. and maximum pressure for 15 minutes. Upon exiting the Carver press, a mold was prepared. Weight 39.8 g.

What is claimed is:

1. A cured nut waste composite, the composite comprises:
   a) 65 to 99.9 wt % of a nut waste component is selected from a group consisting of nut shells, nut hulls, and a combination of nut shells and nut hulls;
   b) 0.1 to 35 wt % of one or more binders is selected from a group consisting of polyhydroxybutyrate (PHB), polyhydroxyalkanoate (PHA), a mixture of polyhydroxybutyrate (PHB) and polylactic acid (PLA), guayule, natural latex, bentonite, an anionic starch, hyaluronic acid, and any combinations thereof;
   wherein the nut shells, nut hulls, and a combination of nut shells and nut hulls has a size less than 250 μm or ranges from greater than 250 μm to less than 500 μm;
   further wherein the cured nut waste composite exhibits an elastic modulus ranging from 2000 N/mm² to 2800 N/mm², and a break stress from 3.0 N/mm² to 40 N/mm²; and
   wherein the composite comprises at least one fungus, at least one bacteria, or a combination of at least one fungus and at least one bacteria.

2. The cured nut waste composite of claim 1, wherein the nut waste component selected from a group consisting of nut shells, nut hulls, and a combination of nut shells and nut hulls is dried, sterilized, or torrefied.

3. The cured nut waste composite of claim 1, wherein a pH of the nut waste component selected from a group consisting of nut shells, nut hulls, and a combination of nut shells and nut hulls ranges from about 5.5 to 8.0.

4. The cured nut waste composite of claim 3, wherein the pH of the nut waste component selected from a group consisting of nut shells, nut hulls, and a combination of nut shells and nut hulls ranges from about 6.5 to 7.0.

5. The cured nut waste composite of claim 1, wherein the nut waste component selected from a group consisting of nut shells, nut hulls, and a combination of nut shells and nut hulls comprise mixtures of cellulose, hemicellulose, and lignin.

6. The cured nut waste composite of claim 1, wherein the at least one fungus, at least one bacteria, or a combination of at least one fungus and at least one bacteria comprises *Mycorrihizal inoculum, aureofaciens, Deinococcus erythromyxa, Glomus intraradices, Glomus mosseae, Glomus aggregatum, Glomus clarum, Glomus deserticola, Glomus etunicatum, Gigaspora margarita, Rhizopogon villosullus, Rhizopogon luteolus, Rhizopogon amylopogon, Rhizopogon fulvigleba, Pisolithud tinctorius, Laccaria lacata, Laccari bicolor, Suillus granulatus, Suillus puntatapies, Trichoderma harzianum Trichoderma konigii, Bacillus subtillus, Bacillus lichenformis, Bacillus azotoformans, Bacillus megaterium, Bacillus coagulans, Bacillus pumlis, Bacillus thurengiensis, Bacillus stearothermiphilis, Paenibacillus polymyxa, Paenibacillus durum, Paenibacillus florescence, Paenibacillus gordonae, Azotobacter polymyxa, Azotobacter chroococcum, Sacchtomyces cervisiae, Streptomyces griseues, Streptomyces lydicus, Pseudomonas aureofaceans, Deinococcus erythromyxa, Aureofaceans,* and *Deinococcus erythromyxa.*

7. The cured nut waste composite of claim 1, wherein the nut waste composite is in the form or shape of viscous liquid resins, solid resins, pellets, flakes, disks, wafers, or ribbons.

8. A cured nut waste composite, the composite comprises:
   a) 15 to 65 wt % of a nut waste component is selected from a group consisting of nut shells, nut hulls, and a combination of nut shells and nut hulls;
   b) 35 to 85 wt % of one or more binders is selected from a group consisting of polyhydroxybutyrate (PHB), polyhydroxyalkanoate (PHA), a mixture of polyhydroxybutyrate (PHB) and polylactic acid (PLA), guayule, natural latex, bentonite, an anionic starch, hyaluronic acid, and any combinations thereof;
   wherein the nut shells, nut hulls, and a combination of nut shells and nut hulls has a size less than 250 μm or ranges from greater than 250 μm to less than 500 μm;
   further wherein the cured nut waste composite exhibits an elastic modulus ranging from 2000 N/mm² to 2800 N/mm², and a break stress from 3.0 N/mm² to 40 N/mm²; and
   wherein the composite comprises at least one fungus, at least one bacteria, or a combination of at least one fungus and at least one bacteria.

9. The cured nut waste composite of claim 8, wherein the nut waste component selected from a group consisting of nut shells, nut hulls, and a combination of nut shells and nut hulls is dried, sterilized, or torrefied.

10. The cured nut waste composite of claim 8, wherein a pH of the nut waste component selected from a group consisting of nut shells, nut hulls, and a combination of nut shells and nut hulls ranges from about 5.5 to 8.0.

11. The cured nut waste composite of claim 10, wherein the pH of the nut waste component selected from a group consisting of nut shells, nut hulls, and a combination of nut shells and nut hulls ranges from about 6.5 to 7.0.

12. The cured nut waste composite of claim 8, wherein the nut waste component selected from a group consisting of nut shells, nut hulls, and a combination of nut shells and nut hulls comprise mixtures of cellulose, hemicellulose, and lignin.

13. The cured nut waste composite of claim 8, wherein the at least one fungus, at least one bacteria, or a combination of at least one fungus and at least one bacteria comprises *Mycorrihizal inoculum, aureofaciens, Deinococcus erythromyxa, Glomus intraradices, Glomus mosseae, Glomus aggregatum, Glomus clarum, Glomus deserticola, Glomus etunicatum, Gigaspora margarita, Rhizopogon villosullus, Rhizopogon luteolus, Rhizopogon amylopogon, Rhizopogon fulvigleba, Pisolithud tinctorius, Laccaria lacata, Laccari bicolor, Suillus granulatus, Suillus puntatapies, Trichoderma harzianum Trichoderma konigii, Bacillus subtillus, Bacillus lichenformis, Bacillus azotoformans, Bacillus megaterium, Bacillus coagulans, Bacillus pumlis, Bacillus thurengiensis, Bacillus stearothermiphilis, Paenibacillus polymyxa, Paenibacillus durum, Paenibacillus florescence, Paenibacillus gordonae, Azotobacter polymyxa, Azotobacter chroococcum, Sacchtomyces cervisiae, Streptomyces griseues, Streptomyces lydicus, Pseudomonas aureofaceans, Deinococcus erythromyxa, Aureofaceans,* and *Deinococcus erythromyxa.*

14. The cured nut waste composite of claim 8, wherein the nut waste composite is in the form or shape of viscous liquid resins, solid resins, pellets, flakes, disks, wafers, or ribbons.

15. A cured nut waste composite, the composite comprises:
 a) 5 to 15 wt % of a nut waste component is selected from a group consisting of nut shells, nut hulls, and a combination of nut shells and nut hulls;
 b) 85 to 95 wt % of one or more binders is selected from a group consisting of polyhydroxybutyrate (PHB), polyhydroxyalkanoate (PHA), a mixture of polyhydroxybutyrate (PHB) and polylactic acid (PLA), guayule, natural latex, bentonite, an anionic starch, hyaluronic acid, and any combinations thereof;
 wherein the nut shells, nut hulls, and a combination of nut shells and nut hulls has a size less than 250 μm or ranges from greater than 250 μm to less than 500 μm;
 further wherein the cured nut waste composite exhibits an elastic modulus ranging from 2000 N/mm² to 2800 N/mm², and a break stress from 3.0 N/mm² to 40 N/mm²; and
 wherein the composite comprises at least one fungus, at least one bacteria, or a combination of at least one fungus and at least one bacteria.

16. The cured nut waste composite of claim 15, wherein the nut waste component selected from a group consisting of nut shells, nut hulls, and a combination of nut shells and nut hulls is dried, sterilized, or torrefied.

17. The cured nut waste composite of claim 15, wherein a pH of the nut waste component selected from a group consisting of nut shells, nut hulls, and a combination of nut shells and nut hulls ranges from about 5.5 to 8.0.

18. The cured nut waste composite of claim 15, wherein the pH of the nut waste component selected from a group consisting of nut shells, nut hulls, and a combination of nut shells and nut hulls ranges from about 6.5 to 7.0.

19. The cured nut waste composite of claim 15, wherein the nut waste component selected from a group consisting of nut shells, nut hulls, and a combination of nut shells and nut hulls comprise mixtures of cellulose, hemicellulose, and lignin.

20. The cured nut waste composite of claim 15, wherein the at least one fungus, at least one bacteria, or a combination of at least one fungus and at least one bacteria comprises *Mycorrihizal inoculum, aureofaciens, Deinococcus erythromyxa, Glomus intraradices, Glomus mosseae, Glomus aggregatum, Glomus clarum, Glomus deserticola, Glomus etunicatum, Gigaspora margarita, Rhizopogon villosullus, Rhizopogon luteolus, Rhizopogon amylopogon, Rhizopogon fulvigleba, Pisolithud tinctorius, Laccaria lacata, Laccari bicolor, Suillus granulatus, Suillus puntatapies, Trichoderma harzianum Trichoderma konigii, Bacillus subtillus, Bacillus lichenformis, Bacillus azotoformans, Bacillus megaterium, Bacillus coagulans, Bacillus pumlis, Bacillus thurengiensis, Bacillus stearothermiphilis, Paenibacillus polymyxa, Paenibacillus durum, Paenibacillus florescence, Paenibacillus gordonae, Azotobacter polymyxa, Azotobacter chroococcum, Sacchtomyces cervisiae, Streptomyces griseues, Streptomyces lydicus, Pseudomonas aureofaceans, Deinococcus erythromyxa, Aureofaceans,* and *Deinococcus erythromyxa.*

21. The cured nut waste composite of claim 15, wherein the nut waste composite is in the form or shape of viscous liquid resins, solid resins, pellets, flakes, disks, wafers, or ribbons.

22. The cured nut waste composite of any one of the claim 1, 8, or 15, wherein the cured nut waste composite exhibits a max stress ranging from 7.0 N/mm² to 42.0 N/mm².

23. The cured nut waste composite of any one of the claim 1, 8, or 15, wherein the cured nut waste composite exhibits a Max Displacement Strain (%) from 0.5 to 7.0.

24. The cured waste composite of any one of the claim 1, 8, or 15, wherein the cured waste composite exhibits a toughness (J) of 0.006 to 0.7.

* * * * *